United States Patent [19]
Chang et al.

[11] Patent Number: 5,835,711
[45] Date of Patent: Nov. 10, 1998

[54] METHOD AND SYSTEM FOR IMPLEMENTING MULTIPLE LEAKY BUCKET CHECKERS USING A HYBRID SYNCHRONOUS/ASYNCHRONOUS UPDATE MECHANISM

[75] Inventors: Paul Chang, Peekskill; Roch A. Guerin, Yorktown Heights; Abhay Kumar Parekh, White Plains, all of N.Y.; James Thomas Rayfield, Ridgefield, Conn.

[73] Assignee: International Business Machines Corporation, Armonk, N.Y.

[21] Appl. No.: 382,464

[22] Filed: Feb. 1, 1995

[51] Int. Cl.$^6$ .................................................. G06F 13/00
[52] U.S. Cl. .............................. 395/200.13; 395/200.01; 395/200.06; 395/880
[58] Field of Search ..................... 395/200.01, 200.02, 395/200.06, 200.11, 200.12, 200.13, 880, 881

[56] References Cited

U.S. PATENT DOCUMENTS

| | | |
|---|---|---|
| 3,903,371 | 9/1975 | Colten et al. . |
| 4,769,811 | 9/1988 | Eckberg, Jr. et al. . |
| 4,896,316 | 1/1990 | Lespagnol et al. . |
| 5,007,043 | 4/1991 | van den Dool et al. . |
| 5,050,163 | 9/1991 | Van Bavel et al. . |
| 5,117,417 | 5/1992 | Danner . |
| 5,159,447 | 10/1992 | Haskell et al. . |
| 5,182,744 | 1/1993 | Askew et al. . |
| 5,274,644 | 12/1993 | Berger et al. ............... 370/95.1 |
| 5,402,426 | 3/1995 | Foglar et al. ............... 371/20.1 |
| 5,418,777 | 5/1995 | Worster ....................... 370/17 |
| 5,440,671 | 8/1995 | Shiratani et al. ............ 395/25 |
| 5,440,727 | 8/1995 | Bhide et al. ................ 395/444 |
| 5,533,020 | 7/1996 | Byrn et al. ................. 370/60.1 |

FOREIGN PATENT DOCUMENTS

| | | |
|---|---|---|
| 34776-A | 9/1981 | European Pat. Off. . |
| 79426-A | 5/1983 | European Pat. Off. . |
| 97309-A | 1/1984 | European Pat. Off. . |
| 275678-A | 7/1988 | European Pat. Off. . |
| 381275-A | 8/1990 | European Pat. Off. . |
| 419959-A | 4/1991 | European Pat. Off. . |
| 425777-A | 5/1991 | European Pat. Off. . |
| 520590-A1 | 12/1992 | European Pat. Off. . |
| 529351-A2 | 3/1993 | European Pat. Off. . |
| 2225917 | 6/1990 | United Kingdom . |
| WO9303564-A2 | 2/1993 | WIPO . |

OTHER PUBLICATIONS

"Bandwidth Management and Congestion in plaNET," IEEE Communications Magazine, Oct. 1991, Israel Cidon, et al. pp.54–64.

"Implementation of a Poilce Criterion Calculator Based the (LBA) Leaky Bucket Algorithm", by Van–der Wal et al., IEEE, 1993, p. 715.

Primary Examiner—Jack B. Harvey
Assistant Examiner—Ario Etienne
Attorney, Agent, or Firm—Raymond M. Galasso; Jenkens & Gilchrist; Christian Heusch

[57] ABSTRACT

A leaky bucket checker which combines synchronous updates with event driven asynchronous updates triggered by packet arrivals. A synchronous update is performed exactly as an event-driven update by assuming that a packet of length zero has arrived at the time of the update. These updates are performed in a round robin fashion on each connection. Therefore, assuming that one such update can be performed in each clock tick, the maximum bit representation of the last update time state variable can be limited to N bits for $2^N$ total connections. Given the reduced processing and storage costs, a great number of network connections and leaky bucket checkers is possible.

10 Claims, 4 Drawing Sheets

FIG. 4

| | 31 | 16 | 15 | 0 |
|---|---|---|---|---|
| 410 W0 | LAST UPDATE TIME 418 | | | |
| 412 W1 | PEAK LKD SIZE 422 | PEAK TOKEN CNT 424 | PEAK TOKEN GENERATION RATE 420 | |
| | | | PEAK FRACTION TOKEN COUNT 426 | |
| 414 W2 | GREEN LKB SIZE 428 | | GREEN TOKEN GENERATION RATE 430 | |
| 416 W3 | GREEN TOKEN COUNT 432 | | GREEN FRACTION TOKEN COUNT 434 | |

FIG. 5

| | 31 | 16 | 15 | 0 |
|---|---|---|---|---|
| 510 W0 | CURRENT TICKS VALUE 518 | | TARGET PTGR 520 | |
| 512 W1 | TARGET PLKBS 522 | TARGET PTC 524 | '0000'H 526 | |
| 514 W2 | TARGET GLKBS 528 | | TARGET GTQR 530 | |
| 516 W3 | TARGET GTC 532 | | '0000'H 534 | |

METHOD AND SYSTEM FOR IMPLEMENTING MULTIPLE LEAKY BUCKET CHECKERS USING A HYBRID SYNCHRONOUS/ASYNCHRONOUS UPDATE MECHANISM

TECHNICAL FIELD OF THE INVENTION

This invention relates in general to computer networks and in specific to systems and methods for monitoring and regulating data sent over a large number of network connections simultaneously.

BACKGROUND OF THE INVENTION

A network service provider, an entity which provides network connections to a network user or data source, must carefully monitor and regulate the amount of data sent over its network. Otherwise, one or more sources could send too much data within a certain time period and overload the network. This overload could disrupt network service for other sources using the network.

Network service providers require techniques for monitoring and regulating network traffic to ensure that a source cannot overload the network. One such technique is the "leaky bucket" ("LKB") checker. An LKB monitors and controls a network connection's long term average transmission rate and maximum transmission rate for a fixed time period (the "burst size"). LKB uses transmission credits or tokens which are periodically generated at a fixed rate and which a data source can accumulate up to a maximum limit. Any token received while a source already has the maximum is simply ignored. Each token allows the transmission of a fixed amount of data. Thus, the token generation rate determines the long term sustained transmission rate to which a source is entitled, while the token pool size bounds the maximum burst size the source can transmit.

Normally, the hardware for implementing an LKB is located outside of the users' premises in network concentrators. A network concentrator is a device used to combine many different users' network connections into a single link which can then be connected to a central network. An LKB located at the concentrator can monitor and regulate many different users at the same time.

An LKB must continually track and update the number of tokens available and/or used by each connection to the concentrator. To do these operations, the LKB tracks the amount of data sent over the connection since the last update, the time that has elapsed since the last update and the number of tokens left in the pool after each update is performed. Specifically, given a token pool size M, a token generation rate G, a current time t, a time that has elapsed since the last update $t^-$ and a packet size s, the update algorithm for calculating the number of tokens, T, remaining in the bucket is:

$$T = \min\{M, T+G(t-t^-)\}$$

if (s>T) then error (violation)
else T=T−s

Obviously, to perform this update algorithm on each input of the concentrator requires significant processor resources. The operating rate of the processor that implements the LKB must be such that the time between two clock ticks is no longer than the time between two successive data unit arrivals on a given input link. For example, given operating conditions typical of high-speed networks, i.e., a data unit size of 64 bytes and input link speeds of 800 Megabits/second, the maximum operating tick can last no longer than 640 nsec. Once this base clock rate is determined, the range and precision needed for the different LKB parameters and state variables can be determined.

For each connection, it is necessary to store in memory both the value of the LKB parameters for that connection and the state of that LKB at the time of its last update. Based on the above algorithm, the state variables kept and updated for each leaky bucket are $t^-$ and T, while the associated parameters are G and M.

Under a purely synchronous approach, as disclosed in U.S. Pat. No. 4,896,316, issued Jan. 23, 1990, the state variables of all connections are updated at every clock tick. This is clearly computationally too intensive when thousands of connections are being monitored.

Under a purely asynchronous approach, as disclosed in I. Cidon, I. Gopal and R. Guerin, Bandwidth Management and Congestion Control in plaNET, IEEE Common. Mag. 29, pp. 54–63, October 1991, the state variables of a given connection are only updated upon arrival of a block from that connection. This approach is also likely to lead to large storage and processing costs. For example, $t^-$ is only updated upon packet arrivals. In order to determine the number of bits necessary to represent $t^-$, its maximum possible value must be determined. Assuming that the length between packet arrivals is no greater than M/G, the maximum value of $t^-$ is M/G. This quantity can be as large as 1,000 seconds for a connection with a token generation rate of 16 Kbps and a token pool size of 2 Mbtyes. Under the sample values assumed above for link speed and block size, the operating clock rate is 640 nsec. Therefore, 1,000 seconds represents about $10^9$ clock ticks. Representing the value $t^-$ would then require about 30 bits which, when multiplied by the number of connections, is prohibitive in terms of computation and storage costs.

In addition, neither of the above approaches allows multiple leaky bucket checkers for each network connection. The processor and storage costs associated with each approach increase correspondingly with the number of leaky bucket checkers per connection.

SUMMARY OF THE INVENTION

Therefore, it is an object of the present invention to provide a system and method for implementing a leaky bucket checker which can simultaneously monitor a large number of connections.

It is a further object of the present invention to provide a system and method for implementing a leaky bucket checker whereby less computational power is required than in the prior art.

It is a further object of the present invention to provide a system and method for implementing a leaky bucket checker whereby less storage space is required than in the prior art.

It is a further object of the present invention to provide a system and method for implementing a leaky bucket checker whereby multiple leaky buckets can be used to monitor each connection.

The above and other objects are achieved by a leaky bucket checker which combines synchronous updates with event driven asynchronous updates triggered by packet arrivals. A synchronous update is performed exactly as an event-driven update by assuming that a packet of length zero has arrived at the time of the update. These updates are performed in a round robin fashion on each connection. Therefore, assuming that one such update can be performed in each clock tick, the maximum bit representation of the last update time state variable can be limited to N bits for $2^N$ total connections. Given the reduced processing and storage costs, a great number of network connections and leaky bucket checkers is possible.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which:

FIG. 4 is a representation of a data structure stored in the Background Memory of the Leaky Bucket Monitoring Logic chip; and FIG. 5 is a representation of the initial values of the data structure of FIG. 4.

DETAILED DESCRIPTION OF THE INVENTION

Figure 1:
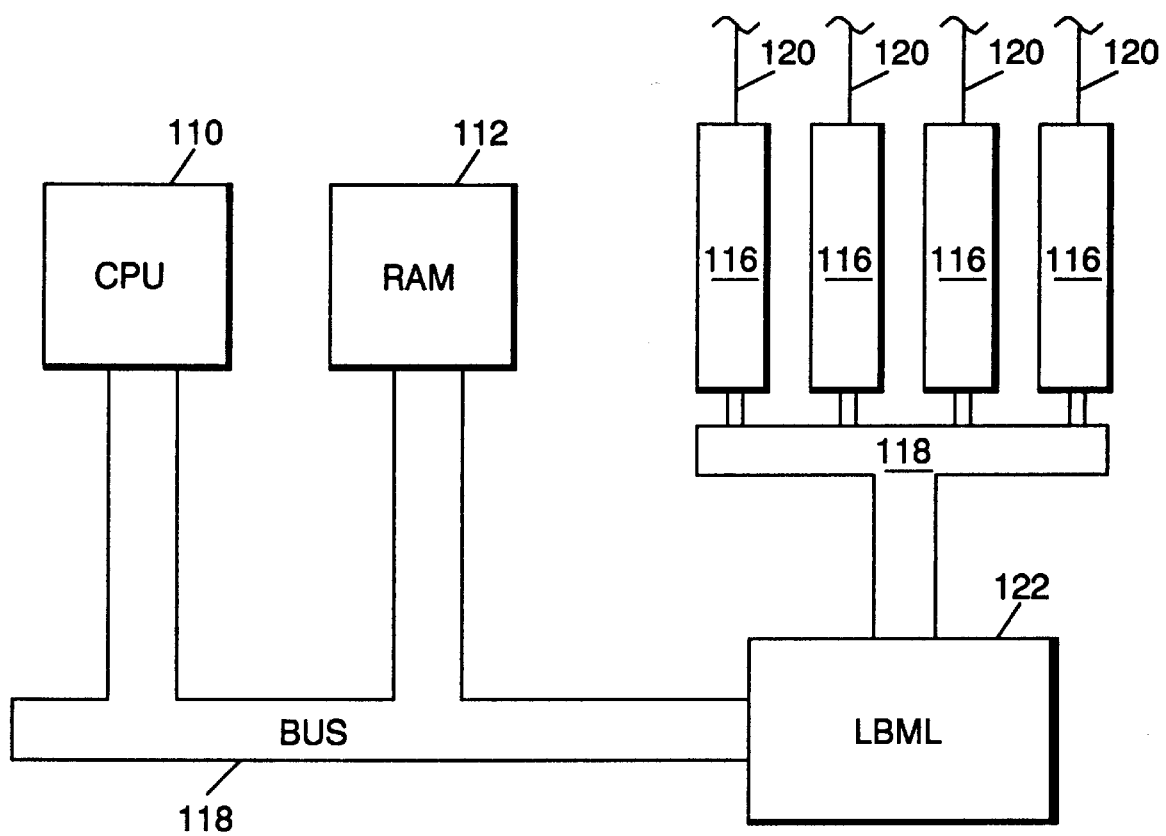
FIG. 1 is a data processing system adopted for execution of a preferred embodiment of the present invention.

Network connections are characterized by traffic parameters that are functions of the contract they have with the network. Roughly speaking, these parameters specify the average or sustained rate, peak rate and burst size to which the connection is entitled. The leaky bucket ("LKB") associated with the connection is responsible for monitoring its traffic to insure that it behaves in compliance with its contract. The Leaky Bucket Monitoring Logic ("LBML"), detailed below, implements multiple LKB checkers for a large number of connections and ensures that each individual data stream is compliant with its contract.

The LBML maintains two leaky bucket checkers per connection: one checks on incoming green (high priority) packets for compliance with the amount of reserved traffic to which the connection is entitled; the other checks both green and red (low priority) packets for peak rate violations. Data is assumed to arrive in blocks of 64 bytes and so packet sizes are counted in terms of blocks with one token allowing transmission of one 64-byte block.

The LBML only performs checking, i.e., determines compliance with the network contract but does not enforce it. However, when a connection is identified as non-compliant, the LBML has the ability to take a number of corrective actions. These actions range from flushing violating packets to tagging them as low priority. However, when a violation is detected the LBML may not always be in a position to take the corrective action on the offending packet itself. Instead, violation information is kept between packets through the use of violation status bits, one for each type of violation (green and peak), that are updated each time the LBML updates the leaky buckets. Thus, any violation penalty can then be applied to the next arriving packet of the appropriate type that belongs to the same connection. Of course, the LBML resets the violation status bits after the penalties are applied.

The LBML also maintains, for each connection, a count of quantities such as the number of green packets, red packets and violating packets. This information is useful for monitoring and billing purposes and may also be used by an offline violation detection module that instructs the LBML on what action it should take on the violating packets of a given connection. When a violation occurs, for example, a module may instruct the LBML to flush the packet, mark the packet or do nothing.

An important aspect of the leaky bucket checking implementation in the LBML is the range of precision of the leaky bucket parameters for both green packet and peak rate monitoring. In addition to specifying a 64-byte block as being the data unit associated with a token, it is also necessary to specify other network and contract variables. An aggregate network input speed of 800 Mbps, which provides an upper bound on the maximum possible token generation rate, is assumed. The bandwidth allocation granularity is taken to be 16 Kbps, which determines both the minimum token generation rate and the size of its increments. The maximum burst size is chosen to be 2 megabytes. In all cases, 16 bits are sufficient to represent the maximum values.

The LBML uses a clock cycle of 40 nsec. The LBML logic performs an update operation on the LKB variables in no greater than 640 nsec. This speed is sufficient to process the incoming data given the parameters stated above, i.e.:

800 Mbps/8 bits=$10^8$ bytes/second; and 64-byte packet/$10^8$=640 nsec/packet.

The LBML maintains the leaky bucket state of all connections in a table that has as many entries as their are connections. The LBML updates each entry in the table by combining synchronous updates with asynchronous event driven updates triggered by packet arrivals. A synchronous update is performed exactly as an event driven one by assuming that packet of zero length has arrived at the time of the update. This update is performed on one of the connections in a round robin fashion every 640 nsec by the LBML. Since the table used to store connection information (leaky bucket parameters and states) is assumed to have about 64K entries, each connection's leaky bucket state will be updated at least once every 41 msec (64K*640 nsec=41 msec).

It is possible that both a synchronous and asynchronous update need to take place for the same connection entry within a single clock tick. It is, therefore, necessary to specify how the LBML arbitrates this situation. If only a synchronous update were performed, then the incoming packet would not be processed. If only the asynchronous update were performed, then, depending on the packet type, some fields of the LKB table might not be updated and could become stale before the next synchronous update. The LBML deals with this situation by updating all fields appropriately in cases where both an asynchronous and a synchronous need to be performed simultaneously. For example, in such instances the green packet leaky bucket parameters are updated even upon receipt of a red packet (a green packet size of zero is assumed). Note that a synchronous update should not trigger any setting or resetting of the violation status bits.

As mentioned earlier, the LBML, in addition to performing a leaky bucket checking function, also provides traffic monitoring information for each connection. In particular it keeps track of red and green packet and block counts as well as violation block counts. If the network transport protocol uses a fixed packet size, then blocks and packets are equal and the LBML only need track one variable. Note that green and peak violations are tracked separately, but only block counts are kept. This represents a trade-off between the available storage space for counters and the accuracy of the violation information being tracked. The counting on incoming packets is done before any action, e.g., flushing or marking, has been taken by the LBML, so that the green and red packets and block counts are representative of the traffic stream generated by the user rather than what is forwarded. For example, in the case of an incoming green packet which is marked red because the green violation status bit was set, the green rather than red packet and block counts are incremented.

Similarly, violation counts are updated to reflect the sizes of the offending packets, i.e., they reflect the number of blocks in violation at the leaky bucket checker. This again provides the offline monitoring logic with accurate information on the nature and volume of the actual violation traffic for each connection. This information is useful in determining the appropriate penalty that need be applied on violating packets.

A representative data processing system for practicing a preferred embodiment of the LBML chip is depicted in FIG. 1. FIG. 1 illustrates a typical hardware configuration of a network concentrator in accordance with the subject invention having central processing unit 110, such as a conventional microprocessor, random access memory ("RAM") 112, and a number of peripheral cards 116 interconnected via system bus 118. The cards are organized into banks and slots, with each card in a slot within a bank of slots. Each peripheral card receives data from a network link 120 and sends it on system bus 118.

A preferred embodiment of the LBML is as a chip 122 located on system bus 118 so that it can process data received by the peripheral cards 116. The data processing system controls LBML chip 122 and uses it to monitor and regulate the data coming through the network links 120. The data processing system combines the data from the network links 120 into a single outgoing link which can then be connected to a central network (not shown). In a typical network environment, a similar data processing system would provide redundant LKB checking on data received by the central network (not shown).

The incoming network links 120 can be of any type of high speed data network. A typical network configuration is a Synchronous Optical Network ("SONET") physical transport layer using Asynchronous Transfer Mode ("ATM") for the transmission of data. For a more detailed understanding of high speed data networks, the reader is advised to see G. McClain, Ed., Handbook of Networking & Connectivity, pp.123–65, 1994, which is hereby incorporated by reference.

Figure 2:
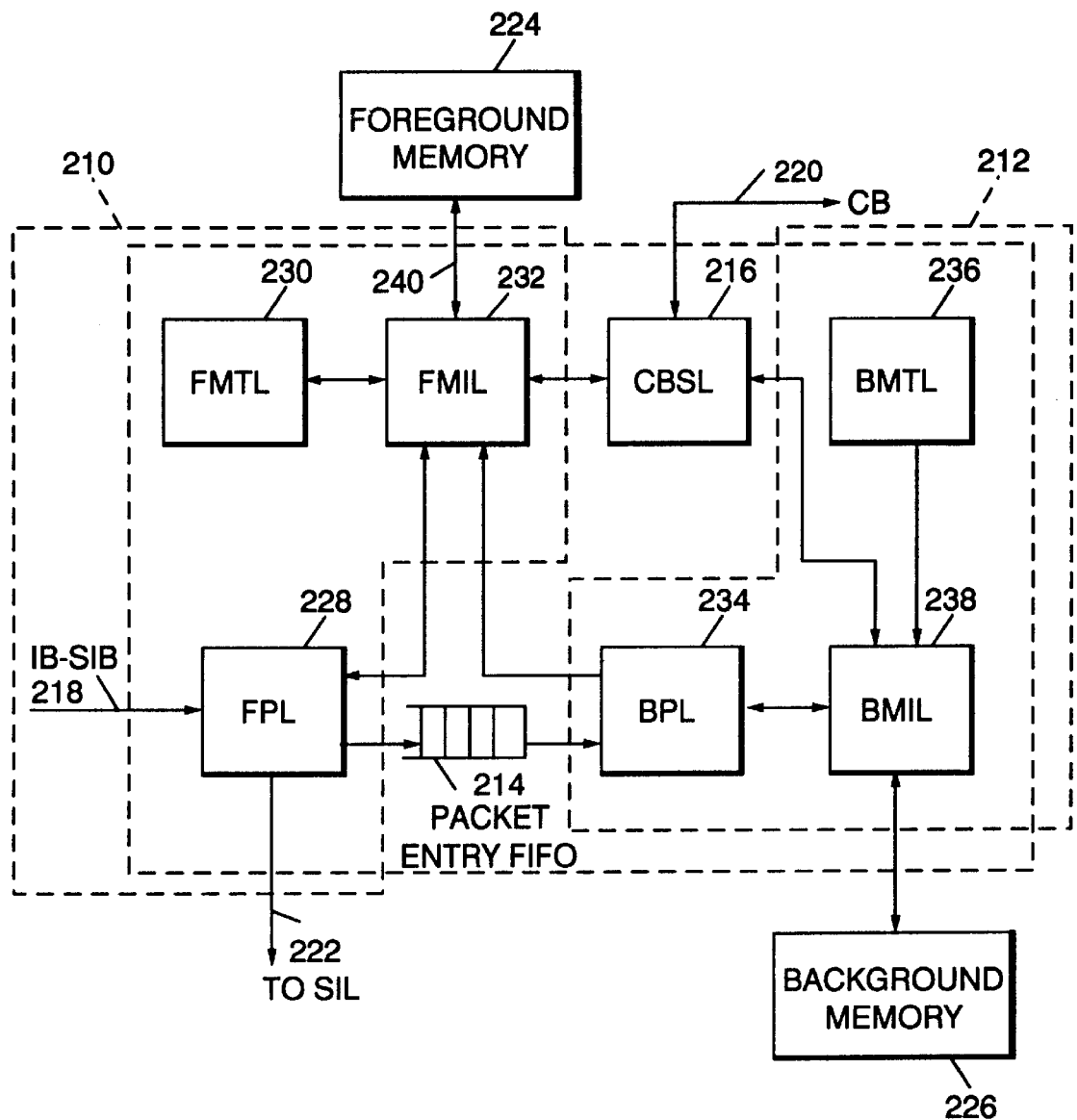
FIG. 2 is a high-level block diagram of a Leaky Bucket Monitoring Logic chip.

FIG. 2 is a high-level block diagram of LBML chip 122. The chip has four major components: Foreground 210, Background 212, Packet Entry FIFO 214 and Control Bus Slave Logic ("CBSL") 216. In addition, the chip has five external interfaces: System Interface Bus ("SIB") 218, Control Bus ("CB") 220, System Interface Logic ("SIL") 222, Foreground Memory ("FM") 224 and Background Memory ("BM") 226.

The Foreground component 210 is divided into 3 logic blocks: Foreground Processing Logic ("FPL") 228, Foreground Memory Test Logic ("FMTL") 230 and Foreground Memory Interface Logic ("FMIL") 232. The Background component 212 is also divided into 3 logic blocks: Background Processing Logic ("BPL") 234, Background Memory Test Logic ("BMTL") 236 and Background Memory Interface Logic ("BMIL") 238.

Packet Entry FIFO 214 is used to pass data from FPL 228 to BPL 234. Packet Entry FIFO 214 is an internal RAM macro. It has eight entries and each entry holds one set of information regarding a packet. The size of the fields of an incoming packet status are: 16 bits for connection ID, 4 bits for packet status and 12 bits for packet block count.

The control interfaces, SIB 218, CB 220 and SIL 222 are standard interfaces and are used to send and receive data from the other logic on the chip. Such interfaces are well understood by those with ordinary skill in the relevant art.

THE FOREGROUND COMPONENTS

FM 224 is connected to EMIL 232 via 48-bit data bus 240. EMIL 232 is a simple logic interface to FM 224. EMIL 232 can perform two memory operations in one clock cycle. Each of the two memory operations can be a read or write operation. EMIL 232 is also connected to FPL 228, FMTL 230 and BPL 234.

FMTL 230 is connected to FM 224 via EMIL 232. FMTL 230 is used to perform basic hardware integrity tests on FM 224. FMTL 230 supports six test patterns: all "0"; all "1"; "A55A"; "0" walk through; "1" walk through; and scan test.

Figure 3:
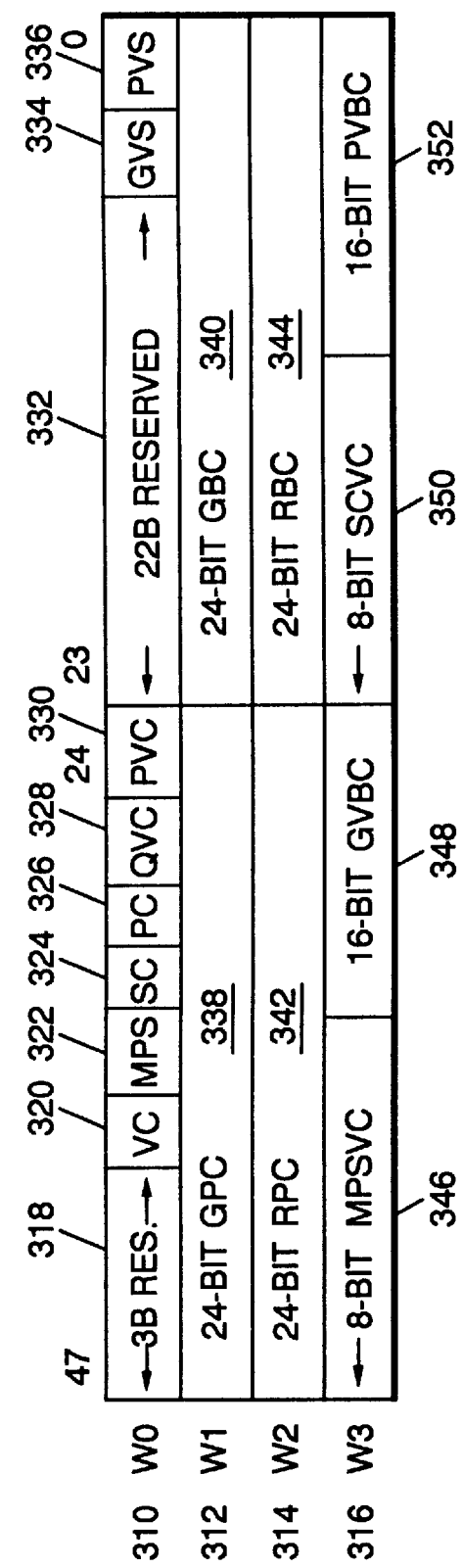
FIG. 3 is representation of a data structure stored in the Foreground Memory of the Leaky Bucket Monitoring Logic chip.

FM 224 stores the connection table used by the LKB. There is a connection table entry for each network connection. The data structure used for each connection table entry is shown in FIG. 3. The entry is divided into four 48-bit words 310–316. Starting from the high order bit, the bits of word 310 signify the following: three reserved bits 318 have no function; Valid Connection ("VC") bit 320 is "1" for a successful connection and otherwise "0"; eight Maximum Packet Size ("MPS") bits 322 define the maximum packet size the connection can carry; two Service Class ("SC") bits 324 are set to "01" for real time, "10" for reserve and "11" for non-reserve service; three Packet Command ("PC") bits 326, three Green LKB Violation Command ("GVC") bits 328 and three Peak LKB Violation Command ("PVC") bits 230 are set to "000" for no action, "001" for sampling packet, "010" for changing packet type, "011" for sampling packet type and "100" for flushing packet; the next 22 bits 332 are reserved; Green LKB Violation Status ("GVS") bit 334 is "1" to indicate a connection green LKB violation; and Peak LKB Violation Status ("PVS") bit 336 is "1" to indicate a connection peak LKB violation.

Word 312 contains the 24-bit fields Green Packet Counter ("GPC") 338 and Green Block Counter ("GBC") 340. Word 314 has two 24-bit fields containing Red Packet Counter ("RPC") 342 and Red Block Counter ("RBC") 344. Word 216 contains an 8-bit Maximum Packet Size Violation Counter ("MPSVC") 346, a 16-bit Green LKB Violation Block Counter ("GVBC") 348, an 8-bit Service Class Violation Counter ("SCVC") 350 and a 16-bit Peak LKB Violation Block Counter ("PVBC") 352. If the table entry is for an invalid connection, denoted by a "0" in VC bit 320, the lower 24 bits of word 316 are used as an invalid connection packet counter.

FPL 228 receives the incoming packets and performs preliminary processing. FPL 228 detects the Start Of Packet ("SOP") command from SIB 218. When a SOP command is detected, FPL 228 parses the service class, type and connection ID from the packet header and saves the information in its internal registers (not shown). FPL 228 uses the connection ID from the packet header to fetch the associated connection data table entry (FIG. 3) from FM 224 via FMIL 232. FPL 228 then compares and processes the data parsed from the packet header with the information in the data structure. After packet processing is completed, FPL 228 puts the connection ID, packet status and Packet Block Count ("PBC") into Packet Entry FIFO 214. The information in Packet Entry FIFO 214 is used by BPL 234 to further process the packets.

There are two different types of packet violations: state independent and state dependent. FPL 228 can detect state independent violations because doing so does not require any complex packet processing. Such violations include the maximum packet size, service class and invalid connection violations. If a packet is larger than the maximum packet size allowed on its connection, FPL 228 flushes the packet and marks the fields of the FIFO 214 packet to indicate that MPSVC 346 should be incremented. If the service class information from the packet header does not match the information in the data structure, FPL 228 flushes the packet and marks the fields of the FIFO 214 packet to indicate that SCVC 350 should be incremented. If VC bit 320 in the table entry is "0," then the connection is invalid and FPL 228 flushes the packet and marks the fields of the FIFO 214 packet to indicate that the lower 24 bits of word 316 (the invalid connection packet counter) should be incremented.

The state dependent violations depend on past packets and include green and peak leaky bucket violations. FPL 228 cannot detect these violations, but can use the information in the connection table to process the results of past violations. If an incoming packet is green and the GVS bit 334 is "1", then FPL 228 executes the instruction defined in GVC 328. If the packet is green or red and PVS bit 336 is "1", then FPL 228 executes the instruction defined in PVC 330.

If there is no violation, FPL 228 performs the action determined by the value of PC bits 326 in the table entry. Then, for all packet types and violation conditions, FPL 228 places information in Packet Entry FIFO 214 indicating the type of packet and violation status.

THE BACKGROUND COMPONENTS

BM 226 is connected to BMIL 238 via a 32-bit bus with four parity bits. BMTL 36 is connected to BM 226 via BMIL 238. BMIL 238 and BMTL 236 perform the same functions as their corresponding foreground components, FMIL 232 and FMTL 230, respectively. Like FM 224, BM 226 holds a connection table with an entry for each network connection. Each table entry is comprised of four 32-bit words and holds the LKB variables and parameters. FIG. 4 shows the data structure for each connection table entry in BM 226. FIG. 5 shows the initial values for each connection table entry.

Word 410 is divided into 16-bit fields 418 and 420. Field 418 contains the Last Update Time ("LUT"). The LUT holds a value representing the tick count of the processor clock. At initial set up, chip microcode writes the current tick count to the LUT field (518). Field 420 of word 410 holds the Peak Token Generation Rate ("PTGR"). The PTGR is a value representing the number of peak tokens generated per tick in units of $\frac{1}{64}$K. At initial set up, chip microcode loads the PTGR with a value determined by the target connection's network contract. A value of '0000'h indicates that peak token monitoring is disabled.

Word 412 is divided into 8-bit field 422, 8-bit field 424 and 16-bit field 426. Field 422 contains the Peak LKB Size ("PLKBS"), which is the maximum number of tokens allowed in the peak LKB. The most significant bit of this field is "0" and is reserved. During initial set up, chip microcode loads the PLKBS field with a value determined by the target connection's network contract (522). Field 424 contains the Peak Token Count ("PTC"), which is the number of peak tokens in the pool. Like field 422, the most significant bit of field 424 is "0" and is reserved. During initial set up, chip microcode loads the PTC field 424 with the field's maximum value (524). Field 426 contains the Peak Fraction Token Count ("PFTC"), which is the number of fraction peak tokens in the pool in units of $\frac{1}{64}$K. At initial set up, chip microcode loads the value '0000'h into this field (526).

Word 414 is divided into 16-bit fields 428 and 430. Field 428 contains the Green LKB Size ("GLKBS"), which is the maximum number of tokens allowed in the green LKB. At initial set up, chip microcode loads this field with a value determined by the connection's network contract (528). Field 430 contains the Green Token Generation Rate ("GTGR"), which is the number of green tokens generated per clock tick in units of $\frac{1}{64}$K. At initial set up, chip microcode loads this field with a value determined by the connection's network contract (530). A value of '0000'h indicates that the green LKB function is disabled.

Word 416 is divided into 16-bit fields 432 and 434. Field 432 contains the Green Token Count ("GTC"), which is the number of green tokens currently in the pool. At initial set up, chip microcode loads this field with its maximum value (532). Field 434 contains the Green Fraction Token Count ("GFTC"), which is the number of fraction green tokens in the pool in units of $\frac{1}{64}$K. At initial set up, this field is loaded with '0000'h (534).

BPL 234 performs both the synchronous and asynchronous packet updates. Every 16 clock cycles (640 nsec), BPL 234 performs up to 4 LKB update operations in a pipelined fashion. The order of these update operations is as follows: (1) synchronous peak; (2) synchronous green; (3) asynchronous peak; and (4) asynchronous green. The synchronous LKB operations are performed on the connection specified in the MTC register in CBSL 216. Asynchronous LKB operations are performed on the connection specified in the first packet entry in Packet Entry FIFO 214.

BPL 234 receives and processes the packet from Packet Entry FIFO 214 and fetches the table entries from FM 224 and BM 226 for the target connection. The general procedure of an LKB update operation for a target network connection in BPL 234 comprises: (1) fetching LUT 418 and \_TGR ("\_" can be "P" for Peak or "G" for Green) of the target connection from BM 226; (2) updating LUT 418 of the target connection with the Current Tick ("CT") value; (3) calculating the Elapsed Time ("ET"), as ET=CT−LUT; (4) fetching \_LKBS, \_TC and \_FTC of the target connection from BM 226; (5) calculating an Accumulated Token Count ("ATC"), as ATC=(TC & FTC)+(ET*\_TGR), where the "&" operator indicates concatenation and "*" indicates multiplication; and (6) calculating a current token count ("CTC") using the rules: if ATC>=LKBS, then CTC=LKBS, else CTC=ATC.

If the LKB update operation is an asynchronous update operation, the following additional steps are also performed: (7) calculating a final token count ("FTC"), as FTC=CTC−PBC; (8) if FTC is negative, updating either GVBC 348 or PVBC 352 (or both), depending on which LKB was violated.

Finally, both the synchronous and asynchronous LKB update operations update the _TC and _FTC fields of the target connection in BM 226 using CTC as calculated above in step 6. At this point, BPL 234 also updates the counters for state independent and state dependent variables in FM 224. If the packet information received from FIFO 214 indicates a state independent violation, then, depending on the violation type, BPL 234 increments MPSVC 346, SCVC 350 or the lower 24 bits of word 316. If there is a Green LKB violation, then BPL 234 increments GVBC 348 and sets GVS 334. If there is a peak LKB violation, BPL 234 increments PVBC 352 and sets PVS 336. Then, BPL 234 increments either GPC 338 and GBC 340 or RPC 342 and RBC 344, depending on whether the packet is green or red.

If both a synchronous and an asynchronous update need to take place for the same connection entry within a single clock tick, the update is performed as follows: (1) for green packets, an asynchronous update of the green LKB and an asynchronous update of the peak LKB is performed; (2) for red packets, a synchronous update of the green LKB (using a packet of size 0) and an asynchronous update of the peak LKB is performed.

To support the LKB update operations described above in a pipelined fashion, BPL 234 contains a sequential state machine and the following major computing units: (1) a 16-bit by 4-bit 2-input multiplier unit ("MU"); (2) a 16-bit 2-input adder unit ("AU 0"); and a 20-bit 2-input adder unit ("AU 1"). In addition, BPL 234 has several internal registers ("Rn(x,y)") which are used to hold results from the computational units. The synchronous and asynchronous LKB update procedures performed by BPL 234 are described by the table in Table 1.

CBSL 220 supports control bus slave functions and allows FM 224, BM 226 and LBML internal control/status registers to be accessed by central processor 110 through the CB 220 interface. CBSL 220 contains several internal control/status registers and a set of error/statistical counters (not shown). The registers in CBSL 220 include the:

(1) Chip ID register. This is a 24-bit wide register. The first 16 bits are used to identify the chip while the last eight identify the chip version number.

(2) Chip Status register. This register has six defined bits. Bit 0 is the BIST completion bit. A "1" in bit 0 indicates the completion of the chip's built in self test ("BIST"). Bit 1 is the BIST status bit. A "1" in bit 1 indicates a successful BIST while a "0" indicates a failed BIST. Bit 2 is the Memory Test Completion bit. Bit 2 is set to "1" to indicate the completion of a memory test. Bit 3 is the Memory Test Status bit. Bit 3 is set to "1" to indicate a successful memory test and to "0" if the test fails. Bit 4 is the CB Address Parity Error bit. Bit 4 is set to "1" to indicate that a CB 220 address parity error has been detected since the chip was last reset. Bit 5 is the CB Data Parity Error bit. Bit 5 is set to "1" to indicate a CB 220 data parity error has been detected since the chip was last reset.

(3) Chip Control register. This register has seven defined bits. Bit 0 is the Chip Active bit. Setting bit 0 to "1" enables chip functions. Bit 1 is the Chip Soft-Reset bit. When bit 1 is changed from "1" to "0," the whole chip, except for the Chip Control register will be reset. Bit 2 is the BIST Execution bit. When Bit 2 is changed from "1" to "0," the chip BIST is executed. Bit 3 is the Memory Test Execution bit. When bit 3 is changed from "1" to "0," a memory test is executed as defined by bit 4. Bit 4 is the Memory Test Version bit. When bit 4 is "0," a full version of the memory test is executed. Otherwise, a quick memory test is executed. Bit 5 is the Reset CB Address Parity Error bit. A "1" in bit 5 resets the CB Address Parity Error bit in the Chip Status register. Bit 6 is the Reset CB Address Parity Error bit. A "1" in bit 6 will reset the CB Data Parity Error bit in the Chip Status register.

(4) CB Address Error register. This register has 32 bits and is used to log CB 220 data when a CB 220 data parity error is detected. Bits 0–31 hold the CB 220 address that caused the error.

(5) CB Data Error register. This register is 32 bits wide and is used to log CB 220 data when a CB 220 data parity error is detected. Bits 0–31 hold the CB 220 data that caused the error.

(6) Monitor Control register. This register has four defined bits. Bits 3 to 0 are the Peak LKB Resolution. This field defines the block size for peak LKB. The block size for the peak LKB is $2^N*64$ bytes, where N is the value in this field.

(7) Monitor Tick Counter ("MTC"). This 16-bit register holds the current clock tick of the LKB operation. This register is initialized to '0000'h and is incremented by 1 every 16 clock cycles. The MTC register holds the value copied into LUT 418 by BPL 34 and is used to specify the connection which is synchronously updated.

(8) Violation Counter Clear register. This register is 17 bits wide, write-only, and is used to clear SCVC 350 and MPSVC 346. When bit 16 is set to "0" SCVC 350 will be cleared. Otherwise, MPSVC 234 is cleared. Bits 15–0 identify the connection ID to be cleared.

(9) SIB Parity Error Counter. This 16-bit counter counts the number of SIB 18 parity errors detected.

(10) Foreground Memory Parity Error Counter. This 16-bit counter counts the number of FM 24 parity errors detected.

(11) Background Memory Parity Error Counter. This 16-bit counter counts the number of BM 26 parity errors detected.

(12) CB Parity Error Counter. This 16-bit counter counts the number of CB 220 parity errors detected.

Table 2 is a table which shows the control bus address map for the logical entries defined in the LBML chip. To address a CB entity in the LBML, such as FM 24, the high order address bits must comply with the following format: bits 31–29 hold the bank address; bits 28–25 hold the card slot address; and bits 24–23 hold the binary value "01."

Although the present invention and its advantages have been described in detail, it should be understood that various changes, substitutions and alterations can be made herein without departing from the spirit and scope of the invention as defined by the appended claims.

TABLE 1

LKB Operational State Sequence

| C | BMOP | AU 0 | MU | AU 1 |
|---|------|------|-----|------|
| 0 | R1(31:0) = LUT & PTGR; | | | |
| 1 | W0 = CT & R1(15:0); | R9(15:0) = CT – R1(31:16); | | |
| 2 | R5(31:0) = PLKBS & PTC & PFTC; | | R3(19:0) = R9(15:0) * R1(3:0); | |
| 3 | | | R3(19:0) = R9(15:0) * R1(7:4); | R4(20:0) = R3(19:0) + R5(19:0); |
| 4 | | | R3(19:0) = R9(15:0) * R1(11:8); | R6(3:0) = R4(3:0); R10(4:0) = ('000' B & R4(20)) + R5(23:20); R4(20:0) = R3(19:0) + (R10(3:0) & R4(19:4)); |
| 5 | | R2(31:0) = GLKBS & GTGR; | R3(19:0) = R9(15:0) * R1(15:12) | R6(7:4) = R4(3:0); R10(4:0) = ('00' B & (R10(4) + R4(20)) + (R5(23) & R5(23) & R5(23) & R5(23)); R4(20:0) = R3(19:0) + (R10(3:0) & R4(19:4)); |
| 6 | R7(31:0) = GTC & GFTC; | | R3(19:0) = R9(15:0) * R2(3:0); | R6(11:8) = R4(3:0); R10(4:0) = ('00' B & (R10(4) + R4(20)) + (R5(23) & R5(23) & R5(23) & R5(23)); R4(20:0) = R3(19:0) + (R10(3:0) & R4(19:4)); |
| 7 | | VF = (R5(23) == 0 && ((R4(19:4) >= ('00'h & R5(31:24))) \|\| R4(20) == 1)) \|\| R5(23) == 1 && (R4(19:4) >= ('00'h & R5(31:24))) && (R10(0) == 1 \|\| R4(20) == 1)); | R3(19:0) = R9(15:0) * R2(7:4) | R6(31:12) = R4(19:0); R4(20:0) = R3(19:0) + R7(19:0); |
| 8 | W1 = R5(31:24) & R6(23:0), if VF = 0; W1 = R5(31:24) & R5(31:24) & '0000'h, if VF = 1; | | R3(19:0) = R9(15:0) * R2(11:8); | R6(3:0) = R4(3:0); R10(4:0) = ('000' B & R4(20)) + R7(23:20); R4(20:0) = R3(19:0) + (R10(3:0) & R4(19:4)); |
| 9 | R1(31:0) = LUT & PTGR; | | R3(19:0) = R9(15:0) * R2(15:12); | R6(7:4) = R4(3:0); R10(4:0) = ('00' B & (R10(4) + R4(20))) + R7(27:24); R4(20:0) = R3(19:0) + (R10(3:0) & R4(19:4)); |
| 10 | R5(31:0) = PLKBS & PTC & PFTC; | | R3(19:0) = R9(15:0) * R1(3:0); | R6(11:8) = R4(3:0); R10(R:0) = ('00' B & (R10(4) + R4(20))) + R7(31:28); R4(20:0) = R3(19:0) + (R10(3:0) & R4(19:4)); |
| 11 | | VF = (R7(31) == 0 && ((R4(19:4) >= R2(31:16)) \|\| R4(20) == 1)) (R7(31) == 1 && (R4(19:4) >= R2(31:16)) && (R10(0) == 1 \|\| R4(20) == 1)); | R3(19:0) = R9(15:0) * R1(7:4); | R6(31:12) = R4(19:0); R4(20:0) = R3(19:0) + R4(19:0); |
| 12 | W3 = R6(31:0), if VF = 0; W3 = R2(31:16) & '0000'h, if VF = 1; | | R3(19:0) = R9(15:0) * R1(11:R); | R6(3:0) = R4(3:0); R10(4:0) = ('000' B & R4(20)) + R5(23:20); R4(20:0) = R3(19:0) + (R10(3:0) & R4(19:4)); |
| 13 | R2(31:0) = GLKBS & GTGR; | | R3(19:0) = R9(15:0) * R1(15:12); | R6(7:4) = R4(3:0); R10(R:0) = ('00' B & (R10(4) + R4(20)) + (R5(23) & R5(23) & R5(23)); R4(20:0) = R3(19:0) + (410(3:0) & R4(19:4)); |
| 14 | R7(31:0) = GTC & GFTC; | | R3(19:0) = R9(15:0) * R2(3:0); | R6(11:8) = R4(3:0); 410(4:0) = ('00' B & (R10(4) + R4(20)) + (R5(23) & R5(23) & R5(23) & R5(23)); R4(20:0) = R3(19:0) + (R10(3:0) & R4(19:4)); |
| 15 | | VF = (R5(23) == 0 && (R4(19:4) >= ('00'h & R5(31:24))) \|\| R4(20) == \|)) \|\| (R5(23) == \| && (R4(19:4) >= ('00'h & R5(31:24))) && (R10(0) = –\| \|\| R4(20) ==\|)); | R3(19:0) – R9)15:0) * R2(7:4) | R6(31:12) – R4(19:0); R4(20:0) – R3(19:0) + R7(19:0); |
| 0 | | R8(15:0) = R6(15:0); R8(31:16) = ('00'h & R6(23:16)) – PBC, if VF = 0; R8(15:0) = '000'h; R8(31:16) = ('00' & R5(31:24)) – PBC, if VF = 1; | R3(19:0) = R9(15:0) * R2(11:8); | R6(3:0) = R4(3:0); R10(0) = carry of the sums of R4(20) and R5(23:20); R4(20:0) = R3(19:0) + (sum of R4(20) and R5(23:20)) & R4(19:4)); |
| 1 | W1 – R5(31:24) & R8(23:0); | | R3(19:0) – R9(15:0) * R2(15:12); | R6(7:4) = R4(3:0); R10(4:0) = ('00'B & (R10(0) + R4(20)) + R5(27:24); R4(20:0) = R3(19:0) + (R10(3:0) & R4(19:4)); |

TABLE 1-continued

LKB Operational State Sequence

| C | BMOP | AU 0 | MU | AU 1 |
|---|---|---|---|---|
| 2 | | | | R6(11:8) = R4(3:0); R10(4:0) = ('00'B & R10(0) = R4(20)) = R5(27:24); R4(20:0) = R3(19:0) + (410(3:0) & R4(19:4)); |
| 3 | | VF = (R5(23) == 0 && (R4(19:4) >= ('00'h & R5(31:24))) \|\| R4(20) == \|)) \|\| (R5(23) == 1 && (R4(19:4) >= ('00'h & R5(31:24))) && (R10(0) == \| \|\| R4(20) == \|)); | | R6(31:12) = R4(19:0); |
| 4 | | R8(15:0) = R6(15:0); R8(31:16) = (R6(31:16)) − PBC, if VF = 0; R8(15:0) = '0000'h; R8(31:16) = (R2(31:16)) − PBC, if VF = 1; | | |
| 5 | W3 = R8(31:0); | | | |

&: Bit Concatenation
==: Logical "Equal" Operation
 : Logical "AND" Operation
\|: Logical "OR" Operation

TABLE 2

LBML Control Bus Address Map

| | | | | Reset Value | | | |
|---|---|---|---|---|---|---|---|
| CB Address (A22-A00) | Entity | Size (bits) | R/W Access | 33222222 10987654 | 22221111 32109876 | 11111100 54321098 | 00000000 76543210 |
| '00_0000'h | Chip ID Register (CIR) | 24 | rd | nnnnnnnn | 00000000 | 00000011 | 00000001 |
| '00_0001'h | Chip Status Register (CSR) | 6 | rd | nnnnnnnn | nnnnnnnn | nnnnnnnn | nn00dddd |
| '00_0002'h | Chip Control Register (CCR) | 7 | wr | nnnnnnnn | nnnnnnnn | nnnnnnnn | n00ddddd |
| '00_0003'h | CB Address Error Register (AER) | 32 | rd | 00000000 | 00000000 | 00000000 | 00000000 |
| '00_0004'h | CB Data Error Register (DER) | 32 | wr | 00000000 | 00000000 | 00000000 | 00000000 |
| '00_0005'h | Monitor Control Register (MCR) | 4 | rd/wr | nnnnnnnn | nnnnnnnn | nnnnnnnn | nnnn0000 |
| '00_0006'h | Monitor Tick Counter (MTC) | 16 | rd/wr | nnnnnnnn | nnnnnnnn | 00000000 | 00000000 |
| '00_0007'h | Violation Counter Clear Register (VCCR) | 17 | wr | nnnnnnnn | nnnnnnn0 | 00000000 | 00000000 |
| '00_8000'h | SIB Parity Error Counter (SIBPEC) | 16 | rd/wr | nnnnnnnn | nnnnnnnn | 00000000 | 00000000 |
| '00_8001'h | Foreground Memory Parity Error Counter (FMPEC) | 16 | rd/wr | nnnnnnnn | nnnnnnnn | 00000000 | 00000000 |
| '00_8002'h | Background Memory Parity Error Counter (BMPEC) | 16 | rd/wr | nnnnnnnn | nnnnnnnn | 00000000 | 00000000 |
| '00_8003'h | CB Parity Error Counter (RPDBC) | 16 | rd/wr | nnnnnnnn | nnnnnnnn | 00000000 | 00000000 |
| '01_0000'h–'04_FFFF'h | Background Memory (BM) Structure | 32 | rd/wr | dddddddd | dddddddd | dddddddd | dddddddd |
| '08_0000'h–0F_FFFF'h | Foreground Memory (FM) Structure | 24 | rd/wr | nnnnnnnn | dddddddd | dddddddd | dddddddd |

Reset Value Key
0: Zero after POR and software reset
1: One after POR and software reset
r: Reserved (reads zero)
d: Device dependent
X: Don't Care
*: Zero after POR but not altered by software reset
!: One after POR but not altered by software reset
n: Not applicable
R: Range

What is claimed is:

1. A data processing system for performing leaky bucket checking of data packets received from a network input, comprising:

a network contract defining a leaky bucket, said network contract associated with said network input and having variables and counters;

asynchronous updating means for asynchronously updating said variables and said counters of said network contract when said data packets are received on said network input;

synchronous updating means for synchronously updating said variables of said network contract;

memory means for storing said variables and counters of said network contract;

retrieving means for retrieving said variables and counters of said network contract from said memory means;

processing means for comparing said data packets with said variables associated with said network contract, enforcing compliance with network contract and updating said variables and counters to produce updated variables and updated counters;

storing means for storing said updated variables and said updated counters in said memory means;

a clock having a time associated with said network input;

means for calculating a current token count from said clock and said variables; and means for storing said current token count in said memory means.

2. The data processing system claim 1, wherein said variables associated with said network contract comprise:

a maximum token pool size;

a token generation rate;

a number of tokens in a token pool; and a last update time of said variables associated with said network input.

3. A method of performing leaky bucket checking in a data processing system receiving data packets from a network input, comprising:

specifying a network contract defining a leaky bucket, said contract having variables and counters and said contract associated with said network input;

asynchronously updating said variables and said counters of said network contract when said data packets are received on said network input;

synchronously updating said variables of said network contract;

wherein said asynchronously updating said variables and said counters of said network contract when said data packets are received on said network input comprises the steps of:

retrieving said variables and said counters of said network contract from memory means for storing variables and counters;

processing said data packets by comparing said data packets with said variables, enforcing compliance with said network contract and updating said variables and counters to produce updated variables and updated counters;

storing said updated variables and said updated counters in said memory means;

retrieving a time from a clock, said time associated with said network input;

calculating a current token count from said time and said variables; and storing said current token count in said memory means.

4. The method of claim 3, wherein said variables of said network contract comprise:

a maximum token pool size;

a token generation rate;

a number of tokens in a token pool; and a last update time of said variables associated with said network input.

5. The method of claim 3, wherein said retrieving said variables and said counters of said network contract from memory means for storing variables and counters comprises the steps of:

processing a data packet arriving on said network input to determine a connection ID; and retrieving variables and counters associated with said connection ID from said memory means.

6. The method of claim 3, wherein said synchronously updating said network input comprises performing asynchronous updating using a data packet of size zero.

7. A method of performing leaky bucket checking in a data processing system receiving data packets from a network input, comprising:

specifying a network contract defining a leaky bucket, said contract having variables and counters and said contract associated with said network input;

asynchronously updating said variables and said counters of said network contract when said data packets are received on said network input;

synchronously updating said variables of said network contract;

wherein said synchronously updating said variables of said network contract comprises the steps of:

retrieving a time from a clock, said time associated with said network input;

retrieving said variables of said network contract associated with said time from memory means for storing variables;

updating said variables of said network contract associated with said time to produce updated variables; and storing said updated variables in said memory means;

calculating a current token count from said time and said variables; and storing said current token count in said memory means.

8. The method of claim 7, further comprising the step of updating a plurality of network inputs in a round-robin fashion.

9. The method of claim 7, wherein said variables of said network contract comprise:

a maximum token pool size;

a token generation rate;

a number of tokens in a token pool; and a last update time of said variables associated with said network input.

10. The method of claim 7, wherein said synchronously updating said network input comprises performing asynchronous updating using a data packet of size zero.

* * * * *